March 13, 1945.  D. F. JORGENSEN  2,371,447
LATCH FOR RODENT TRAP
Filed Nov. 30, 1943
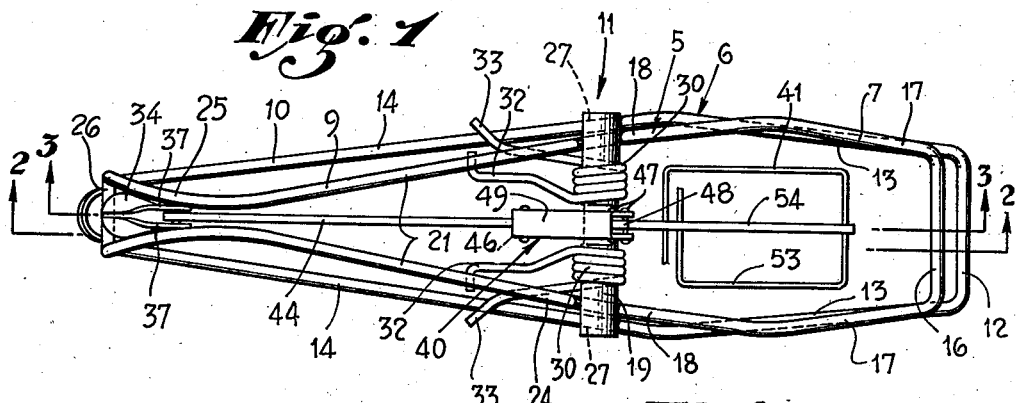
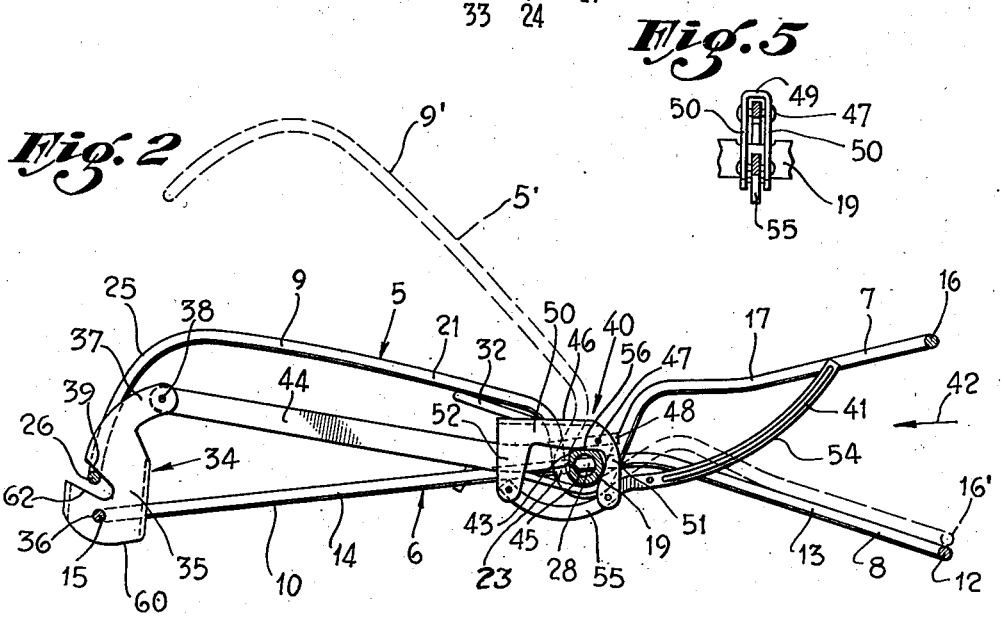
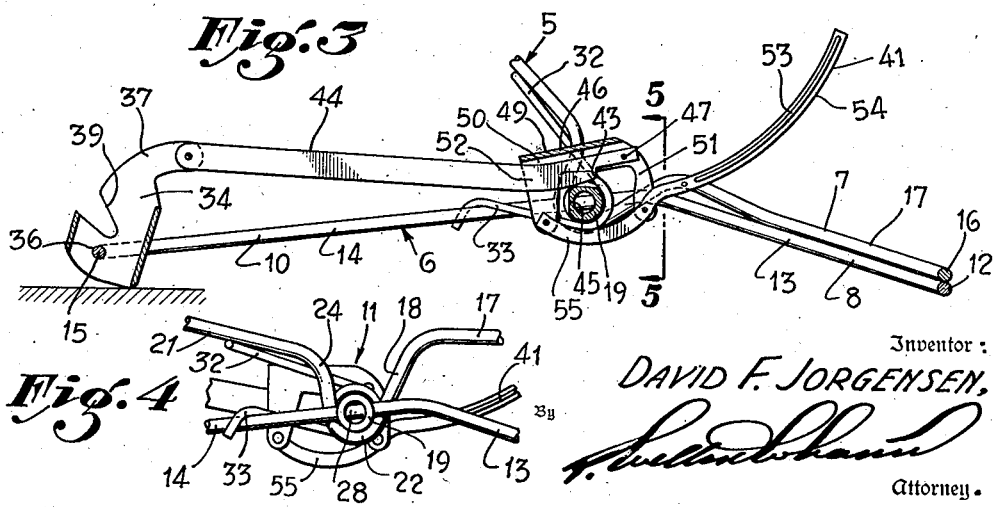
Inventor:
DAVID F. JORGENSEN,
By
Attorney.

Patented Mar. 13, 1945

2,371,447

UNITED STATES PATENT OFFICE 2,371,447

LATCH FOR RODENT TRAPS

David F. Jorgensen, Temple City, Calif.

Application November 30, 1943, Serial No. 512,292

9 Claims. (Cl. 43—88)

The present invention relates to traps for burrowing rodents, such as gophers and moles, and is a continuation-in-part of the invention disclosed in my copending application, Serial No. 406,627, filed August 13, 1941, for Trap for ground burrowing rodents, and upon which Patent No. 2,337,822 issued December 28, 1943.

It is an object of the invention to provide a trap having a simple, effective, and safe latch means for holding the jaws of the trap in open relation.

A further object of the invention is to provide a trap having a latch which effectively holds the jaws open, but has in association therewith releasing means requiring but small pressure by the animal or rodent to release the latch so as to spring the trap.

A further object of the invention is to provide a latch means for a trap which is not readily jarred into releasing position. In fact, the latch means holds the jaws open in such a secure manner that in many instances the jaws of the set trap have been employed for the purpose of reaming out the entrance to a gopher hole, without releasing the latch.

A further object of the invention is to provide a trap having a first latch for holding the trap jaws open against the closing force of a heavy spring, and a second latch for controlling the release of the first latch, this second latch requiring extremely small pressure by the rodent or animal to release it. By the provision of this new latching means for the trap, I have produced a trap especially suitable for catching of gophers and moles which very rarely fails in its intended purpose.

Further objects and advantages of the invention will be brought out in the following part of the specification.

Referring to the drawing which is for illustrative purposes only,

Fig. 1 is a plan view, drawn to slightly reduced scale, of a preferred form of my invention in set position.

Fig. 2 is a section taken as indicated by the line 2—2 of Fig. 1.

Fig. 3 is a sectional view taken on the line 3—3 of Fig. 1, and showing the trap in "sprung" position.

Fig. 4 is a fragmentary elevational view showing the hinge means by which the upper and lower parts of the trap are connected.

Fig. 5 is a fragmentary section taken as indicated by the line 5—5 of Fig. 3.

In the preferred embodiment of my invention shown in the drawing I provide an upper member 5 and a lower member 6, the forward portion of the upper member 5 forming an upper jaw 7, and the forward portion of the lower member 6 forming a lower jaw 8. The rearward portions 9 and 10 of the members 5 and 6 are referred to as handles, since they provide a means by which force may be manually applied to set the trap and by which the trap may be moved or carried while it is in set condition so as to bring the open jaws 7 and 8 into a desired position, for example, within the opening of a burrow.

The upper and lower members 5 and 6 are bent from steel wires so that each forms an elongated loop, these elongated loops being joined intermediate their ends by hinge means 11, such hinge means accordingly defining the plane of separation between the jaws 7 and 8 and the handles 9 and 10.

The lower jaw 8 comprises a relatively narrow cross bar 12 at the forward end thereof, and legs or side bars 13 which extend rearwardly from the end of the cross bar 12. Continuing back or leftward through the hinge means 11, these side bars 13 become the side bars 14 of the lower handle 10, the rear ends of which are joined by a cross bar 15.

The upper jaw 7 comprises a cross bar 16 at the forward end thereof, with legs or side bars 17 extending rearwardly from the ends thereof. In Figs. 1 and 2 the cross bars 12 and 16 are shown in full lines in the position thereof when the jaws 7 and 8 are open. By full lines in Fig. 3 and dotted lines 16' in Fig. 2, the position of the upper cross bar 16 is shown when the jaws 7 and 8 are in close relation. The portions 18 of the side bars 17 bend downward at a sharp angle and are then curved rearward and upward, thereby forming a reentrant or U-shaped bend which passes under a tubular hinge member 19, to cooperate with this tubular member 19 in forming the hinge means 11. The rearward continuations of the side bars 17 form the side bars 21 of the upper handle 9. From the curved portions 22 which extend under the tubular member 19, the forward portions 23 of the side bars 21 extend upward and then bend rearward, as indicated at 24. The rearward parts 25 of the side bars 21 are curved downward and the ends thereof are joined by a cross bar 26. Also, the intermediate portions of the side bars 21 are curved inward toward each other as shown in Fig. 1, so that the upper handle 9 is given greater slenderness than the lower handle 10.

It has been described how the portions 18 and 23 of the side bars of the upper member 5 extend downwardly and under the tubular member 19 at 22, thereby permitting the upper member 5 to swing relatively to the tubular member 19, from the position thereof shown in full lines in Fig. 2 to the position thereof shown in dotted lines 5'. The tubular member 19 is fixed on the side bars of the lower member 6, there being openings 27 in the end portions of the tubular member 19 through which the intermediate sections 28 of the side bars of the lower member 6 pass.

Spring means 30 are provided for urging the jaws 7 and 8 from open to close relation, such spring means being coiled around the tubular member 19, as shown, and having extending ends 32 and 33 to respectively engage the side bars 21 and 14 of the upper and lower handles 9 and 10.

A latch 34 is swingably secured to the cross member 15 at the rear end of the handle 10 and is arranged to engage the cross bar 26 at the rear end of the upper handle 9. This latch 34 comprises a short metal tubular section 35 having openings 36 on the opposite sides thereof to receive the cross bar 15 and having a pair of upwardly extending levers or forks 37 which support a transverse pin 38. The rear portion of the tubular member 35 is notched so as to provide a shoulder 39 which will engage the cross bar 26. Releasing movement of the latch member 34 is controlled by a second latch 40 which in turn is controlled by a trigger or barrier 41 adapted to be engaged by the rodent which enters the space between the jaws 12 and 16, Fig. 2, as indicated by the arrow 42.

The second latch 40 comprises a shoulder 43, on the rightward end of a link 44 which is pivoted on the pin 38 and is arranged for longitudinal movement in the trap device. As shown in Fig. 2, the shoulder 43 engages an abutment 45 formed in the center of the cross bar 19, when the trap is set. The engagement of the shoulder 43 with the abutment 45 prevents rightward movement of the link 44 and the link in turn prevents clockwise rotation of the latch 34 so that the bar 26 at the rearward end of the handle 9 remains in engagement with the latching shoulder 39. The latch means 40 includes means for disengaging the shoulder 43 from the abutment 45. This consists of a lever member 46 which is connected by means of a pivot 47 to the front end (rightward end) of the link 44. The lever member 46 consists of a sheet of relatively thin steel bent so as to provide a narrow top portion 49 and a pair of downwardly extending side portions 50, each of which are cut away so as to form downwardly projecting front and rear legs 51 and 52 extending respectively across the front and rear faces of the central portion of the hinge bar 19.

The trigger 41 includes a rectangular wire frame 53 supported by a curved bar 54, the leftward end of which bar 54, as indicated at 55, connects the lower ends of the downwardly extending legs 51 and 52 of the member 46 so as to provide a closed loop which surrounds the central portion of the hinge bar 19, this loop limiting the movement of the rightward end of the link 44 and preventing movement of the rightward end of the link 44 out of working engagement with the central portion of the hinge bar 19. The downwardly projecting side plates 50 are cut so that they will have downwardly faced edge portions 56 which rest upon the upper face of the hinge bar 19, as shown in Fig. 2, when the trap is set, and the shoulder 43 near the rightward end of the link 44 is in engagement with the abutment 45. Considering that the lever member 46 swings upon the pin 47, it will be noted that the arm 54 which projects forwardly or rightwardly from the lever member 46 is quite long as compared to the distance of the upper face of the cross bar or hinge bar 19 from the pivot pin 47. Therefore, when a rodent moves in the direction indicated by the arrow 42 in Fig. 2 and engages the rightward portion of the trigger 41, the pressure which he may exert against the trigger 41 is greatly multiplied in applying a downward force through the edges 56 of the member 46 against the upper face of the hinge bar 19, with the result that the pivot pin 47 is moved upward with a pressure which is a multiple of the force exerted by the rodent entering the trap, and the rightward end of the link 44 is thereby easily lifted so as to disengage the shoulder 43 from the abutment 45 so that the link 44 may move rightward and permit or control the rightward swinging movement of the upper portion of the latch 34 from the position in which it is shown in Fig. 2 to the position in which it is shown in Fig. 3, the shoulder 39 of the latch 34 thereby being moved out of engagement with the cross bar 26 of the handle 9. The release of the latch 34 in the manner thus described permits the spring means 30 to rotate the upper member 5 of the trap so as to carry the upper jaw 7 downward into engagement with the neck of the rodent, or toward the position in which the jaw 7 is shown in Fig. 3.

The setting of the trap is accomplished merely by moving the handles 9 and 10 thereof toward each other. The lower portion 60 of the latch member 34 is so formed that when the trap is placed upon a flat surface—for example, upon the ground—with the latch 34 and its associated parts in the position shown in Fig. 3, the downward force exerted on the latch 34 through the cross bar 15 will cause an anticlockwise rotation of the latch into the position in which it is shown in Fig. 2, thereby moving the link 44 leftward so that the shoulder 43 will move from the position in which it is shown in Fig. 3 and will drop into the position in which it is shown in Fig. 2 adjacent the abutment 45. Then, if the handle 9 is moved downward from the dotted line position 9' thereof, Fig. 2, the cross bar 26 at the end of the handle 9 will snap over the leftward portion of the latch 34 into engagement with the shoulder 39, owing to the spring characteristics of the material from which the handle 9 is made. Also, should the handle 9 be moved manually toward the handle 10 while the first and second latch parts are in the positions thereof shown in Fig. 3, the bar 26 at the end of the handle 9 will engage an upwardly faced shoulder 62 provided on the leftward portion of the latch 34, and the latch 34 will be thereby rotated in counterclockwise direction so as to move the latch parts from the positions in which they are shown in Fig. 3 to their positions of Fig. 2, thereby bringing the shoulder 43 into engagement with the abutment 45 and bringing the shoulder 39 of the latch 34 into position above the bar 26.

I claim as my invention:

1. In a trap for animals of the character of gophers and moles, the combination of: an upper member and a lower member in coextensive relation, each of said members comprising an elongated wire loop having at the front end thereof a cross bar and side bars extending rearwardly from said cross bar, so as to form a U- shaped jaw at the front end of each of said members, having between said side bars thereof a space to accommodate a portion of the head of the animal when said cross bars of said U-shaped jaws are clamped on the neck of the animal; hinge means connecting said members together at the rear ends of said jaws; spring means exerting a force to swing said jaws together and the rear ends of said members apart; and control means for said members comprising a latch engageable between said members to hold them together so that said jaws will be held apart against the action of said spring means, rodent engageable means disposed intermediate the ends of said members operative by a rodent, a link member connected to said latch so that movement of said link member will control the release of said latch, a second latch to prevent movement of said link member which will effectuate release of the first latch, and means for transmitting latch releasing movement from said rodent engageable means to said second latch.

2. In a trap for animals of the character of gophers and moles, the combination of: an upper member and a lower member in coextensive relation, each of said members comprising an elongated wire loop having at the front end thereof a cross bar and side bars extending rearwardly from said cross bar, so as to form a U-shaped jaw at the front end of each of said members, having between said side bars thereof a space to accommodate a portion of the head of the animal when said cross bars of said U-shaped jaws are clamped on the neck of the animal; hinge means connecting said members together at the rear ends of said jaws; spring means exerting a force to swing said jaws together and the rear ends of said members apart; and control means for said members comprising a latch engageable between the rear ends of said members to hold them together so that said jaws will be held apart against the action of said spring means, rodent engageable means disposed intermediate the ends of said members operative by a rodent, a link member connected to said latch so that movement of said link member will control the release of said latch, said link member extending longitudinally of the trap toward the front end of the trap, a second latch disposed between said rodent engageable means and the rear end of the trap to prevent movement of said link member which will effectuate release of the first latch, and means for transmitting latch releasing movement from said rodent engageable means to said second latch.

3. In a trap for animals of the character of gophers and moles, the combination of: an upper member and a lower member in coextensive relation; hinge means connecting said members together at a point intermediate the ends of said members so that the forward ends thereof will constitute rodent holding means movable together and apart; spring means exerting a force to swing said holding means together and the rear ends of said members apart; and control means for said members comprising a latch engageable between said members to hold them together so that said holding means will be held apart against the action of said spring means, rodent engageable means disposed intermediate the ends of said members operative by a rodent, a link member connected to said latch so that movement of said link member will control the release of said latch, a second latch to prevent movement of said link member which will effectuate release of the first latch, and means for transmitting latch releasing movement from said rodent engageable means to said second latch.

4. In a trap for animals of the character of gophers and moles, the combination of: an upper member and a lower member in coextensive relation; hinge means connecting said members at a point intermediate the ends of said members so that the forward ends thereof will constitute rodent holding means movable together and apart; spring means exerting a force to swing said holding means together and the rear ends of said members apart; and control means for said members comprising a latch engageable between the rear ends of said members to hold them together so that said holding means will be held apart against the action of said spring means, rodent engageable means disposed intermediate the ends of said members operative by a rodent, a link member connected to said latch so that movement of said link member will control the release of said latch, said link member extending longitudinally of the trap toward the front end of the trap, a second latch disposed between said rodent engageable means and the rear end of the trap to prevent movement of said link member which will effectuate release of the first latch, and means for transmitting latch releasing movement from said rodent engageable means to said second latch.

5. In a trap of the character described, the combination of: a first member having transverse hinge means intermediate its front and rear ends; a second member swingable on said hinge means so that a portion thereof will cooperate with the front end of said first member to grip a rodent; spring means to swing said second member so that said portion thereof will move toward said front end of said first member; latch means operative between the rear end of said first member and said second member when said second member is moved against the force of said spring; a link in operative relation to said latch means and having movement for controlling the release of said latch means; a second latch for preventing a movement of said link which will result in the release of said latch means; and a trigger engageable by the rodent and operative to release said second latch.

6. In a trap of the character described, the combination of: a first member having transverse hinge means intermediate its front and rear ends; a second member swingable on said hinge means so that a portion thereof will cooperate with the front end of said first member to grip a rodent; spring means to swing said second member so that said portion thereof will move toward said front end of said first member; latch means operative between the rear end of said first member and said second member when said second member is moved against the force of said spring; a link extending lengthwise of said trap and having the rear end thereof in operative relation to said latch means and having movement for controlling the release of said latch means, there being a shoulder at the forward end of said link; an abutment for engaging said shoulder of said link for preventing a movement of said link which will result in the release of said latch means; and means inclduing a trigger engageable by the rodent and operative to disengage said shoulder of said link from said abutment so that said link may have latch releasing movement.

7. In a trap of the character described, the combination of: a first member having transverse hinge means intermediate its front and rear ends; a second member swingable on said hinge means so that a portion thereof will cooperate with the front end of said first member to grip a rodent; spring means to swing said second member so that said portion thereof will move toward said front end of said first member; latch means operative between the rear end of said first member and said second member when said second member is moved against the force of said spring; a link extending lengthwise of said trap and having the rear end thereof in operative relation to said latch means and having movement for controlling the release of said latch means, there being a shoulder at the forward end of said link; an abutment for engaging said shoulder of said link for preventing a movement of said link which will result in the release of said latch means; a lever pivotally connected to the forward portion of said link for movement to disengage said shoulder of said link from said abutment; and a movable barrier member connected to the lever in such position that it may be moved by a rodent and accomplish swinging of said lever so as to disengage said shoulder from said abutment.

8. In a trap of the character described, the combination of: a first member having transverse hinge means intermediate its front and rear ends; a second member swingable on said hinge means so that a portion thereof will cooperate with the front end of said first member to grip a rodent; spring means to swing said second member so that said portion thereof will move toward said front end of said first member; latch means operative between the rear end of said first member and said second member when said second member is moved against the force of said spring; a link extending lengthwise of said trap and having the rear end thereof in operative relation to said latch means and having movement for controlling the release of said latch means, there being a shoulder at the forward end of said link; a transverse bar forming an abutment for engaging said shoulder of said link for preventing a movement of said link which will result in the release of said latch means; a loop member pivotally connected to the front end of said link member, surrounding said bar so as to limit movement of said link member, a portion of said loop member comprising a cam for moving the forward end of said link member so as to disengage said shoulder from said abutment in response to a movement of said loop member; and a part on said loop member movable by a rodent in said trap to so move said loop member so that said cam will release said shoulder from said abutment so as to effectuate a movement of said link member to release said latch means.

9. In a trap of the character described, the combination of: a first member having transverse hinge means intermediate its front and rear ends; a second member swingable on said hinge means so that a portion thereof will cooperate with the front end of said first member to grip a rodent; spring means to swing said second member so that said portion thereof will move toward said front end of said first member; latch means operative between the rear end of said first member and said second member when said second member is moved against the force of said spring; a link extending lengthwise of said trap and having the rear end thereof in operative relation to said latch means and having movement for controlling the release of said latch means, there being a shoulder at the forward end of said link; an abutment for engaging said shoulder of said link for preventing a movement of said link which will result in the release of said latch means; means including a trigger engageable by the rodent and operative to disengage said shoulder of said link from said abutment so that said link may have latch releasing movement; and means for moving said latch means and said second latch into latched position.

DAVID F. JORGENSEN.